United States Patent
Jain et al.

(10) Patent No.: US 10,798,185 B2
(45) Date of Patent: Oct. 6, 2020

(54) SYSTEMS AND METHODS FOR AUTOMATED SESSION IDENTIFIER PROPAGATION

(71) Applicant: Walmart Apollo, LLC, Bentonville, AR (US)

(72) Inventors: Himanshu Jain, San Diego, CA (US); Vilas Veeraraghavan, Newark, CA (US); Pranav Rajesh Parikh, Milpitas, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 53 days.

(21) Appl. No.: 16/243,004

(22) Filed: Jan. 8, 2019

(65) Prior Publication Data

US 2020/0220937 A1 Jul. 9, 2020

(51) Int. Cl.
*G06F 15/16* (2006.01)
*H04L 29/08* (2006.01)

(52) U.S. Cl.
CPC .......... *H04L 67/146* (2013.01); *H04L 67/02* (2013.01); *H04L 67/2814* (2013.01); *H04L 67/327* (2013.01)

(58) Field of Classification Search
CPC . H04L 67/146; H04L 67/327; H04L 67/2814; H04L 67/02
See application file for complete search history.

(56) References Cited

U.S. PATENT DOCUMENTS

| 6,560,717 | B1* | 5/2003 | Scott | G06F 9/505 714/4.1 |
| 8,996,725 | B2 | 3/2015 | Haywood et al. | |
| 2008/0250031 | A1 | 10/2008 | Ting et al. | |
| 2009/0055904 | A1* | 2/2009 | Gomi | G06F 21/31 726/4 |
| 2012/0078708 | A1 | 3/2012 | Taylor et al. | |
| 2012/0166627 | A1* | 6/2012 | Kraiman | H04L 67/2819 709/224 |
| 2013/0312067 | A1* | 11/2013 | Ogura | H04L 65/1069 726/4 |

(Continued)

*Primary Examiner* — John B Walsh
(74) *Attorney, Agent, or Firm* — Duane Morris LLP; Manita Rawat

(57) ABSTRACT

This application relates generally to automated systems and methods for identifier propagation across uniform resource locator requests. In an embodiment, a system includes at least one processor operatively coupled with a datastore, the at least one processor configured to receive, from a user device, a request message comprising a request component uniform resource locator. The at least one processor is further configured to produce a redirect uniform resource locator in response to the request message not comprising a session identifier, where the redirect uniform resource locator comprises a current session identifier appended to the request component uniform resource locator. The at least one processor is further configured to send, to the user device, a redirection instruction comprising the redirect uniform resource locator, where the redirection instruction indicates that a resource requested by the request message has been temporarily moved to the redirect uniform resource locator.

19 Claims, 6 Drawing Sheets

(56) References Cited

U.S. PATENT DOCUMENTS

| | | | |
|---|---|---|---|
| 2014/0244488 A1* | 8/2014 | Kim | G06Q 20/123 |
| | | | 705/39 |
| 2014/0344326 A1* | 11/2014 | Kamath | G06F 9/5088 |
| | | | 709/203 |
| 2015/0052584 A1* | 2/2015 | Rudraraju | H04L 63/102 |
| | | | 726/4 |
| 2016/0197706 A1 | 7/2016 | Lester et al. | |
| 2016/0371507 A1* | 12/2016 | Jakobsson | H04L 43/06 |
| 2018/0302426 A1* | 10/2018 | Lee | H04L 67/02 |
| 2019/0090133 A1 | 3/2019 | Wang | |

* cited by examiner

SYSTEMS AND METHODS FOR AUTOMATED SESSION IDENTIFIER PROPAGATION

CROSS-REFERENCE TO RELATED APPLICATIONS

This application is related to U.S. application Ser. No. 16/242,997 filed on Jan. 8, 2019 (Attorney Docket No. R3014-06600), which is hereby incorporated by reference in its entirety.

TECHNICAL FIELD

This application relates generally to automated systems and methods for identifier propagation across uniform resource locator requests.

BACKGROUND

Stateless communication protocols, such as the HyperText Transfer Protocol (HTTP) and the Internet Protocol (IP), do not retain information by the sender or receiver, thus making one unaware of the state of the other. For example, in a client-server relationship, a stateless communication protocol may not provide a mechanism for a server to differentiate between associated request messages (e.g., by a single user) across the various clients served by the server. Accordingly, the inability to differentiate between associated request messages may lead to inefficiencies, such as where server testing via a client is performed in series rather than in parallel.

The foregoing examples of the related art and limitations related therewith are intended to be illustrative and not exclusive. Other limitations of the related art will become apparent upon a reading of the specification and a study of the drawings.

SUMMARY

The exemplary embodiments disclosed herein are directed to solving the issues relating to one or more of the problems presented in the prior art, as well as providing additional features that will become readily apparent by reference to the following detailed description when taken in conjunction with the accompanied drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

In an embodiment, a system includes at least one processor operatively coupled with a datastore, the at least one processor configured to receive, from a user device, a request message comprising a request component uniform resource locator. The at least one processor is further configured to produce a redirect uniform resource locator in response to the request message not comprising a session identifier, where the redirect uniform resource locator comprises a current session identifier appended to the request component uniform resource locator. The at least one processor is further configured to send, to the user device, a redirection instruction comprising the redirect uniform resource locator, where the redirection instruction indicates that a resource requested by the request message has been temporarily moved to the redirect uniform resource locator.

In an embodiment, a method performed by a computing device includes receiving, from a user device, a request message comprising a request component uniform resource locator. The method also includes producing a redirect uniform resource locator in response to the request message not comprising a session identifier, where the redirect uniform resource locator comprises a current session identifier appended to the request component uniform resource locator. The method also includes sending, to the user device, a redirection instruction comprising the redirect uniform resource locator, where the redirection instruction indicates that a resource requested by the request message has been temporarily moved to the redirect uniform resource locator.

An embodiment includes a non-transitory computer readable medium having instructions stored thereon. The instructions, when executed by a processor, cause a device to perform operations including: receiving, from a user device, a request message comprising a request component uniform resource locator. The operations also include producing a redirect uniform resource locator in response to the request message not comprising a session identifier, where the redirect uniform resource locator comprises a current session identifier appended to the request component uniform resource locator. The operations also include sending, to the user device, a redirection instruction comprising the redirect uniform resource locator, where the redirection instruction indicates that a resource requested by the request message has been temporarily moved to the redirect uniform resource locator.

BRIEF DESCRIPTION OF THE DRAWINGS

Various exemplary embodiments of the invention are described in detail below with reference to the following Figures. The drawings are provided for purposes of illustration only and merely depict exemplary embodiments of the invention. These drawings are provided to facilitate the reader's understanding of the invention and should not be considered limiting of the breadth, scope, or applicability of the invention. It should be noted that for clarity and ease of illustration these drawings are not necessarily drawn to scale.

DETAILED DESCRIPTION OF EXEMPLARY EMBODIMENTS

Figure 1:
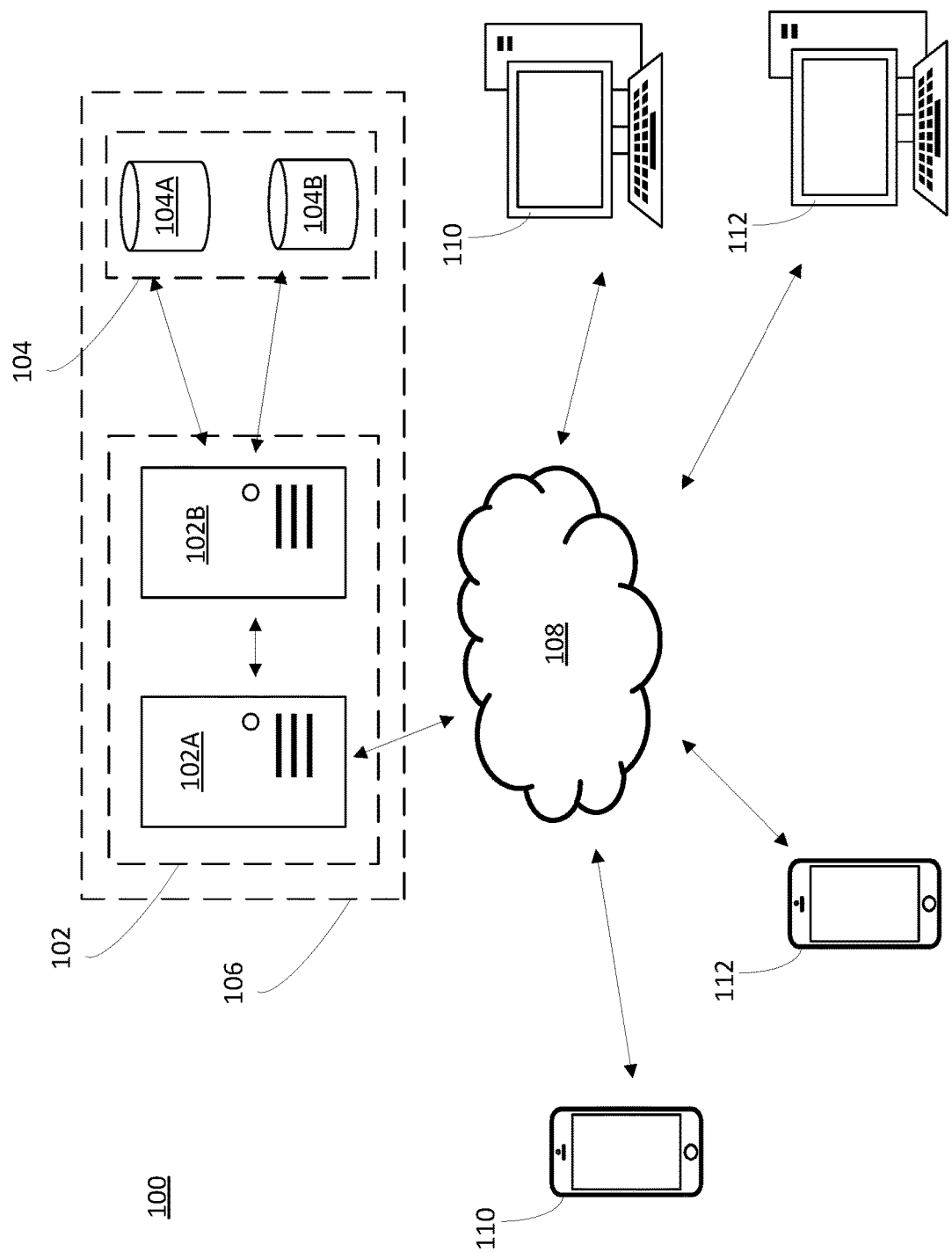
FIG. 1 is a system diagram illustrating features of automated identifier propagation, in accordance with various embodiments.

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described and illustrated herein. Additionally, the specific order or hierarchy of steps in the methods disclosed herein are merely exemplary approaches. Based upon design preferences, the specific order or hierarchy of steps of the disclosed methods or processes can be rearranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

A new approach is proposed that contemplates systems and methods for automated identifier propagation. Automated identifier propagation may ensure that an identifier is associated with each request message by returning a redirection instruction to a requestor to provide such an identifier with a revised and subsequently transmitted request message. The identifier in the redirection instruction may be taken from a previous request message received by a server and/or as assigned by the server in a predetermined manner. Thus, the subsequent request message may be revised to include such an identifier. Advantageously, the forced inclusion of such an identifier may provide state information for stateless communication protocols, such as HTTP. This state information may be utilized for further analysis and/or processing of request messages.

In various embodiments, automated identifier propagation may be utilized in HTTP under a client-server architecture. For example, a client may include a browser (e.g., a web browser or other application for accessing and displaying information from the World Wide Web (WWW)) configured to send request messages to a server and for the server to return resources requested by the request message. These request messages may each include a request component uniform resource locator (URL) and a referral component URL. The server may return a redirection instruction to the browser as a Temporary Redirect 307 should an identifier not be found within the request component URL. The redirection instruction may include a redirect URL that includes an identifier appended to the request component URL. The Temporary Redirect 307 (e.g., HTTP 307 Temporary Redirect) is a redirect status response code that indicates that the resource requested by the request component URL has been temporarily moved to the URL given by the redirect URL. In certain embodiments, the redirect URL may be entered in the location headers of the Temporary Redirect 307, or as a query parameter associated with the request component URL. Accordingly, the browser may then send a subsequent request message that includes the redirect URL (e.g., the session identifier appended to the request component URL).

In certain embodiments, the identifier in the redirect URL (e.g., as appended to the request component URL) may be found from the referral component URL. For example, the referral component URL may include an identifier that is then utilized as the identifier in the redirect URL. In other embodiments, the identifier in the redirect URL may be determined ad hoc in a predetermined manner and then utilized as the identifier in the redirect URL. For example, the identifier may be randomly generated and then utilized as the identifier in the redirect URL. In particular embodiments, a server may be either a proxy server or a backend server. Although certain embodiments discuss how messages may specifically reference a URL to locate a resource (e.g., as a request component URL, a referral component URL or redirect URL) the example of a URL may be replaced with any manner of locating a resource as desired for different applications in various embodiments. For example, instead of a URL, a internationalized resource identifier (IRI), a uniform resource name (URN) or any other uniform resource identifier (URI) may be utilized in place of a URL (e.g., as a request component URI, a referral component URI or redirect URI) in further embodiments.

In certain embodiments, the identifiers utilized in automated identifier propagation may be a session identifier. These session identifiers may be utilized to identify a session, or a set of related transactions tracked by a common session identifier. For example, the session identifier may be represented with a value (e.g., an integer value) and be identifiable within a URL. As a more specific example, when the session identifier has a value of 1000, the session identifier may be identified as part of the URL when represented as "sessionid=1000." Although certain embodiments may describe an identifier (e.g., a session identifier or a rule identifier) as represented with a numeric value, any type of value or expression may be utilized to represent an identifier as desired for different applications in various embodiments. For example, the identifier may be represented with an alpha-numeric value in particular embodiments.

Accordingly, the server may send the resource requested by the request component URL to the browser (e.g., the user device) while also associating this transaction with the session identifier appended to the request component URL. Furthermore, information characterizing transactions associated with a common session identifier may be collectively analyzed and/or retrieved for further review. For example, a log of the transactions associated with a particular session identifier may be stored in a datastore accessible to the server. Then, the server may receive a request from a user device for a transactions analysis of the transactions associated with the particular session identifier. The server may thus send to the requesting user device either a digested analysis of the transactions associated with the session identifier or data characterizing each transaction associated with the session identifier. In certain embodiments, the session identifier may be associated with a particular user, a particular user device, a particular time, and/or any other usage characteristic useful for analysis.

Advantageously, multiple requests may be executed in parallel by the server but yet be differentiable by each request having a respective different session identifier. This may enable parallel tests and network analytics for these parallel tests. For example, each parallel test and/or set of parallel requests may thus be differentiated by specific users, demographic areas, or any other differentiator. Also, such requests with session identifiers may identify and provide unique user data with third party applications without sending personal information from the user device (e.g., by anonymizing requests by session identifier rather than personal information).

In various embodiments, the identifiers utilized in automated identifier propagation may be a rule identifier. These rule identifiers may be utilized to identify a rule definition that includes a rule condition and a rule consequence. A rule condition may be a conditional situation that may invoke the rule consequence. The rule consequence may be an action taken by the server in response to satisfaction of the rule condition. These rule identifiers may be stored within a datastore accessible to a server configured to perform automated identifier propagation. For example, a user device may provide rule definitions as associated with rule identifier values to the server. The server may then store the rule definitions as a rule definition set within the datastore for future retrieval via respective rule identifiers (e.g., as identified by an associated rule identifier value).

For example, a rule condition may be simply receipt of a particular rule identifier value in even intervals (e.g., every second receipt of the particular rule identifier). Also, the rule consequence may be a redirection of the requested resource identified in a request component URL to another predetermined URL. Then, upon satisfaction of the rule condition (e.g., at every second receipt of the particular rule identifier) the rule consequence may be executed (e.g., redirection of the requested resource identified in a request component URL to another predetermined URL). In particular embodiments, the rule identifier may be represented with a value (e.g., an integer value) and be identifiable within a URL. For example, the rule identifier may be identified as part of the URL represented as "ruleid=1000" when the rule identifier has a value of 1000. Although certain embodiments may describe an identifier (e.g., a session identifier or a rule identifier) as represented with a numeric value, any type of value or expression may be utilized to represent an identifier as desired for different applications in various embodiments. For example, the identifier may be represented with an alpha-numeric value in particular embodiments.

In certain embodiments, a rule condition may be more than just receipt of a rule identifier. For example, the rule condition may be based on a history of transactions with one or more user devices. As a more specific example, the rule condition may be based on historical requests from a particular user device and/or from a history of transactions with a user device. As another example, the rule condition may be based on a state of a network element ascertainable by the server. For example, the rule condition may be based on whether the server is able to access a particular service (e.g., whether a specific application or application programming interface API) is responsive in a desired manner to the server).

In particular embodiments, a rule consequence may be a modification of a network element, as controlled and/or instructed by the server. For example, the rule consequence may be a modification or change of a resource requested by a request message. As a further example, the rule consequence may include a modification of, for example, a URL, a header, a cookie, a query parameter, or any other network element. In particular embodiments, the rule consequence can be modification of a requested resource, such as modification of a characterization of inventory (e.g., items for sale) as accessible to a customer.

Advantageously, different rule identifiers may be applied to request messages for execution in parallel, rather than in series, by a server. For example, a server may receive multiple request messages that each have different rule identifiers. The server may determine whether each associated rule condition is satisfied and execute each respective rule consequence in parallel for each request message based on the different rule identifiers. In particular embodiments, these rule identifiers may be utilized to inject faults (e.g., to simulate faulty scenarios) for testing purposes (e.g., for parallel test execution). For example, an original request (e.g., to view a particular website) may invoke multiple ancillary requests (e.g., for various resources to render the various parts of a particular website). Thus, the rule identifier may be propagated from the original request to the ancillary requests so that the body of requests (e.g., the original and ancillary requests) may all be processed by the server in accordance with the rule identifier associated with the original request.

Accordingly, automated identifier propagation may be utilized to implement an automated test solution that allows for mutation of representational state transfer application programming interfaces, either inbound or outbound, based on predefined rules (e.g., rule definitions invoked by rule identifiers in request messages). This may allow for querying of network traffic for application analytics testing in parallel (e.g., in virtue of the independent and different rule identifiers propagated among related request messages).

In certain embodiments, a proxy server may be utilized to separate network traffic based on different rule identifiers or session identifiers. This may support parallel test executions to implement a functionality to intercept inbound or outbound calls and to mutate the calls with predefined rules added to the system for mutation. Furthermore, network data may be queried for analytics testing for individual test cases or sessions for validation. In certain embodiments, automated identifier propagation may be applied to electronic commerce (e-commerce) platforms for automated analytics testing.

FIG. 1 is a system diagram 100 illustrating features of automated identifier propagation, in accordance with various embodiments. A server system 102 (illustrated within dotted lines) may include at least one proxy server 102A and/or at least one back end server 102B. The at least one proxy server 102A may be in communication with the at least one back end server 102B. However, in certain embodiments the server system 102 may simply represent one or more servers without regard to whether they are implemented as a proxy server, back end server, or any other type of server. The server system 102 may be in communication with a datastore system 104. The datastore system 104 may include at least one sessions datastore 104A and/or at least one least one rules datastore 104B. Each datastore may be in independent communication with the server system 102. However, in certain embodiments, the datastore system may be implemented as a single datastore in communication with the server system 102 and not as separate sessions datastores or rules datastores. In certain embodiments, each of the functionality of the server system 102 and/or datastore system 104 may be implemented in a single remote server and/or locally on a local device. In various embodiments, the combination of the server system 102 and the datastore system 104 may be referred to as an automated identifier propagation server system 106.

The server system 102 may be in communication with a network 108, such as the Internet. The network 108 may also be connected with operator user devices 110 and customer user devices 112. Each of the operator user devices 110 and/or customer user devices 112 may be utilized to interact with the automated identifier propagation server system 106 by providing identifiers in request messages so that different processes related to automated identifier propagation requests, as noted below, may be performed. In particular embodiments, an operator user device 110 may be utilized to modify (e.g., add to, delete, or change) the rule definitions stored within the datastore system 104 (e.g., the sessions datastore 104A) while, in contrast, a customer user device may be utilized to send request messages (e.g., requests) and receive response messages (e.g., responses) without modifying the rule definitions stored within the datastore system 104. In further embodiments, there may be no distinction between customer user devices 112 and operator user devices 110 as all user devices (e.g., both customer user devices 112 and operator user devices 110) may be utilized to modify the rule definitions stored within the datastore system 104, send request messages, and receive response messages.

In certain embodiments, user devices (e.g., the customer user devices 112 and/or operator user device 110) may be configured to display a web page (e.g., execute a web browser) and/or execute any other type of program or application (e.g., app) on the user device. Also, either a customer user device 112 or an operator user device 110 may be, for example, a mobile device (e.g., a smartphone or tablet computer), a desktop computer, or any other type of computing device configured to communicate over the network 108.

Figure 2:
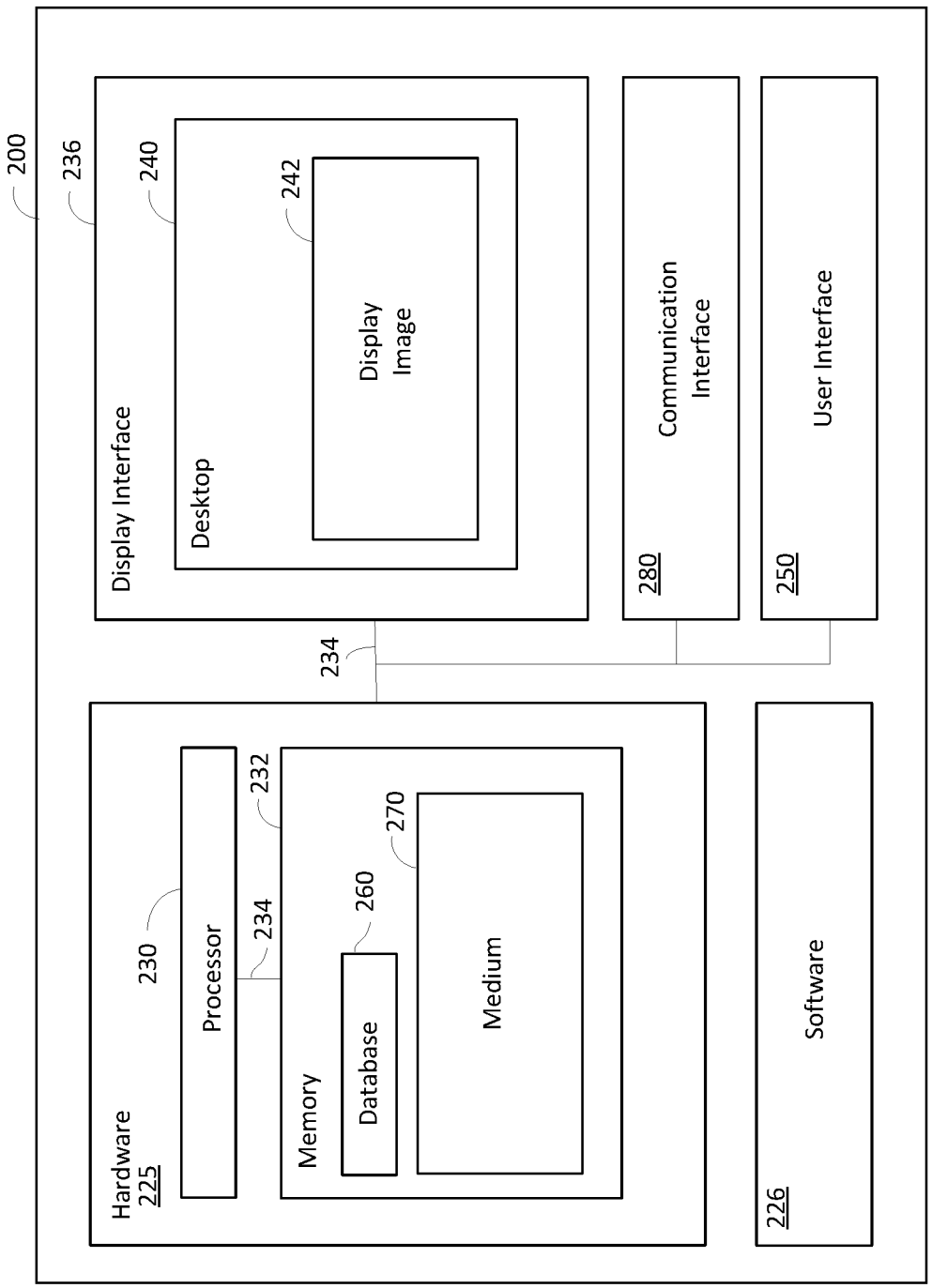
FIG. 2 is a block diagram of an exemplary computing device, in accordance with various embodiments.

FIG. 2 is a block diagram of an exemplary computing device 200, in accordance with various embodiments. As noted above, the computing device 200 may represent exemplary components of a particular user device (e.g., a customer user device or an operator user device) or server (e.g., backend server or proxy server). In some embodiments, the computing device 200 includes a hardware unit 225 and software 226. Software 226 can run on hardware unit 225 (e.g., the processing hardware unit) such that various applications or programs can be executed on hardware unit 225 by way of software 226. In some embodiments, the functions of software 226 can be implemented directly in hardware unit 225 (e.g., as a system-on-a-chip, firmware, field-programmable gate array ("FPGA"), etc.). In some embodiments, hardware unit 225 includes one or more processors, such as processor 230. In some embodiments, processor 230 is an execution unit, or "core," on a microprocessor chip. In some embodiments, processor 230 may include a processing unit, such as, without limitation, an integrated circuit ("IC"), an ASIC, a microcomputer, a programmable logic controller ("PLC"), and/or any other programmable circuit. Alternatively, processor 230 may include multiple processing units (e.g., in a multi-core configuration). The above examples are exemplary only, and, thus, are not intended to limit in any way the definition and/or meaning of the term "processor." Hardware unit 225 also includes a system memory 232 that is coupled to processor 230 via a system bus 234. Memory 232 can be a general volatile RAM. For example, hardware unit 225 can include a 32 bit microcomputer with 2 Mbit ROM and 64 Kbit RAM, and/or a number of GB of RAM. Memory 232 can also be a ROM, a network interface (NIC), and/or other device(s).

In some embodiments, the system bus 234 may couple each of the various system components together. It should be noted that, as used herein, the term "couple" is not limited to a direct mechanical, communicative, and/or an electrical connection between components, but may also include an indirect mechanical, communicative, and/or electrical connection between two or more components or a coupling that is operative through intermediate elements or spaces. The system bus 234 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCMCIA), Small Computers Interface (SCSI) or other proprietary bus, or any custom bus suitable for computing device applications.

In some embodiments, optionally, the computing device 200 can also include at least one media output component or display interface 236 for use in presenting information to a user. Display interface 236 can be any component capable of conveying information to a user and may include, without limitation, a display device (not shown) (e.g., a liquid crystal display ("LCD"), an organic light emitting diode ("OLED") display, or an audio output device (e.g., a speaker or headphones). In some embodiments, computing device 200 can output at least one desktop, such as desktop 240. Desktop 240 can be an interactive user environment provided by an operating system and/or applications running within computing device 200, and can include at least one screen or display image, such as display image 242. Desktop 240 can also accept input from a user in the form of device inputs, such as keyboard and mouse inputs. In some embodiments, desktop 240 can also accept simulated inputs, such as simulated keyboard and mouse inputs. In addition to user input and/or output, desktop 240 can send and receive device data, such as input and/or output for a FLASH memory device local to the user, or to a local printer.

In some embodiments, the computing device 200 includes an input or a user interface 250 for receiving input from a user. User interface 250 may include, for example, a keyboard, a pointing device, a mouse, a stylus, a touch sensitive panel (e.g., a touch pad or a touch screen), a gyroscope, an accelerometer, a position detector, and/or an audio input device. A single component, such as a touch screen, may function as both an output device of the media output component and the input interface. In some embodiments, mobile devices, such as tablets, can be used.

In some embodiments, the computing device 200 can include a database 260 within memory 232, such that various information can be stored within database 260. Alternatively, in some embodiments, database 260 can be included within a remote datastore (not shown) or a remote server (not shown) with file sharing capabilities, such that database 260 can be accessed by computing device 200 and/or remote end users. In some embodiments, a plurality of computer-executable instructions can be stored in memory 232, such as one or more computer-readable storage medium 270 (only one being shown in FIG. 2). Computer-readable storage medium 270 includes non-transitory media and may include volatile and nonvolatile, removable and non-removable mediums implemented in any method or technology for storage of information such as computer-readable instructions, data structures, program modules or other data. The instructions may be executed by processor 230 to perform various functions described herein.

In the example of FIG. 2, the computing device 200 can be a communication device, a storage device, or any device capable of running a software component. For non-limiting examples, the computing device 200 can be but is not limited to a server machine, smartphone, a laptop PC, a desktop PC, a tablet, a Google's Android device, an iPhone, an iPad, and a voice-controlled speaker or controller.

The computing device 200 has a communications interface 280, which enables the computing devices to communicate with each other, the user, and other devices over one or more communication networks following certain communication protocols, such as TCP/IP, http, https, ftp, and sftp protocols. Here, the communication networks can be but are not limited to, the Internet, an intranet, a wide area network (WAN), a local area network (LAN), a wireless network, Bluetooth, WiFi, and a mobile communication network.

In some embodiments, the communications interface 280 may include any suitable hardware, software, or combination of hardware and software that is capable of coupling the computing device 200 to one or more networks and/or additional devices. The communications interface 280 may be arranged to operate with any suitable technique for controlling information signals using a desired set of communications protocols, services or operating procedures. The communications interface 280 may comprise the appropriate physical connectors to connect with a corresponding communications medium, whether wired or wireless.

A network may be utilized as a vehicle of communication. In various aspects, the network may comprise local area networks (LAN) as well as wide area networks (WAN) including without limitation the Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules may communicate in accordance with a number of wired protocols. Examples of wired protocols may comprise Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 280 may comprise one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 280 may comprise a wireless interface comprising one or more antennas, transmitters, receivers, transceivers, amplifiers, filters, control logic, and so forth.

In various aspects, the communications interface 280 may provide data communications functionality in accordance with a number of protocols. Examples of protocols may comprise various wireless local area network (WLAN) protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may comprise various wireless wide area network (WWAN) protocols, such as GSM cellular radiotelephone system protocols with GPRS, CDMA cellular radiotelephone communication systems with 1xRTT, EDGE systems, EV-DO systems, EV-DV systems, HSDPA systems, and so forth. Further examples of wireless protocols may comprise wireless personal area network (PAN) protocols, such as an Infrared protocol, a protocol from the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth. Yet another example of wireless protocols may comprise near-field communication techniques and protocols, such as electro-magnetic induction (EMI) techniques. An example of EMI techniques may comprise passive or active radio-frequency identification (RFID) protocols and devices. Other suitable protocols may comprise Ultra Wide Band (UWB), Digital Office (DO), Digital Home, Trusted Platform Module (TPM), ZigBee, and so forth.

Figure 3:
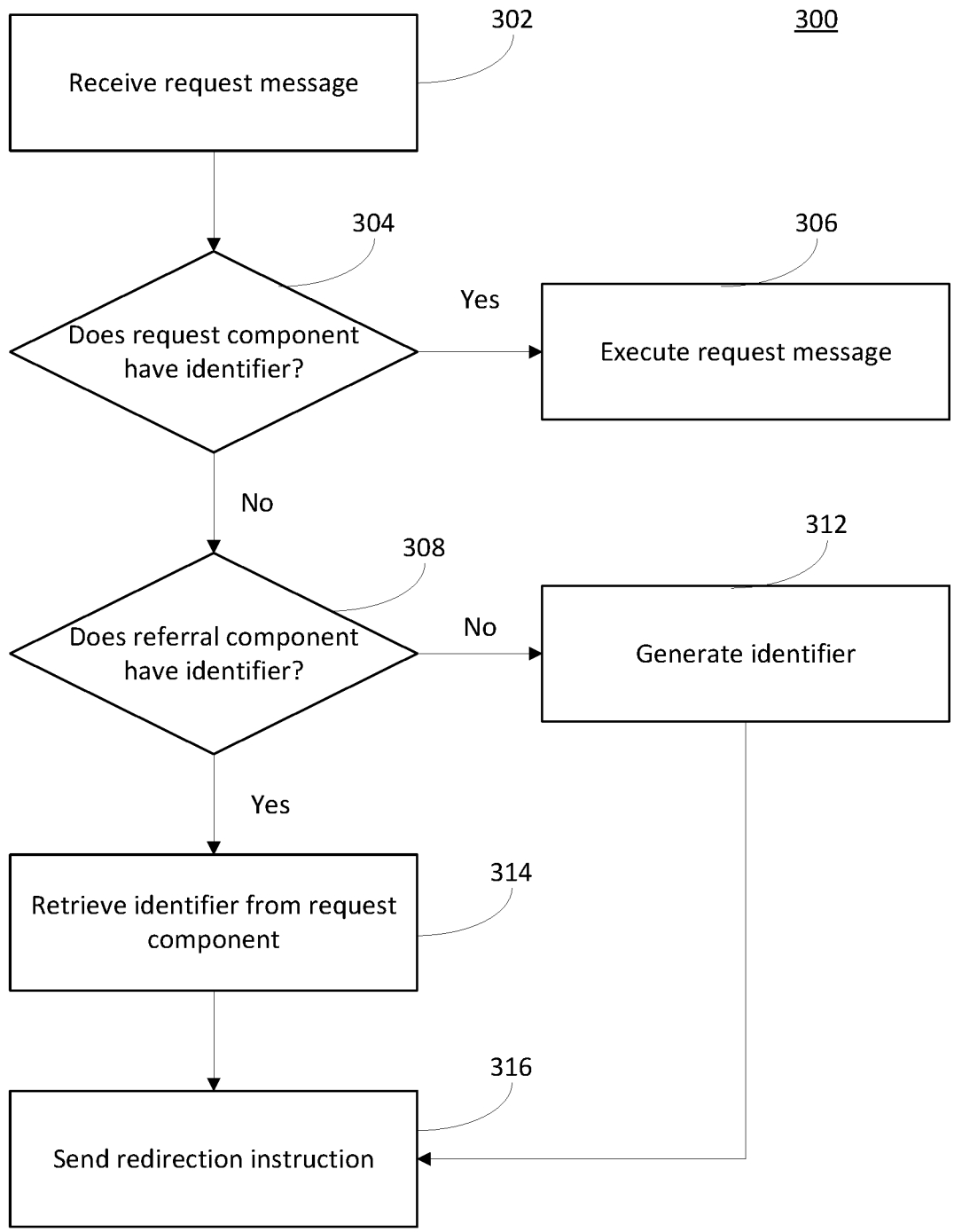
FIG. 3 is a block diagram that illustrates an automated identifier propagation process, in accordance with various embodiments.

FIG. 3 is a block diagram that illustrates an automated identifier propagation process 300, in accordance with various embodiments. The process 300 may be performed at server system in communication with a customer user device, as introduced above. The server system may include a datastore, and at least one server implemented as a proxy server and/or a backend server, for example. It is noted that the process 300 is merely an example, and is not intended to limit the present disclosure. Accordingly, it is understood that additional operations may be provided before, during, and after the process 300 of FIG. 3, certain operations may be omitted, certain operations may be performed concurrently with other operations, and that some other operations may only be briefly described herein. Although a generic example of an identifier is given in FIG. 3, it can be appreciated that any specific type of identifier may be utilized in the embodiments of FIG. 3 for different applications in various embodiments. For example, the identifier recited in FIG. 3 may be a session identifier or a rule identifier.

At operation 302, the server system may receive a request message. This request message may be a request under a client-server architecture. For example, this request message may include HTTP commands (e.g., as URLs). Also, a customer user device, as a client, may include a browser (e.g., a web browser or other application for accessing information on the World Wide Web) configured to send request messages to a server. Also, the server may be configured to return response messages and resources requested by the request message. These request messages may each include a request component URL and a referral component URL. In certain embodiments, the referral component URL may be, for example, an entry within an HTTP header field. The request component URL may be the URL from which a resource is requested by the request message. The referral component URL may identify an address linked to the resource being requested. Stated another way, the referral component may be utilized to check from where a request component originated.

At operation 304, the server system may determine whether the request component has an identifier. The identifier may be explicitly identified in the request component URL, such as by being appended to (e.g., at or adjacent to) a rear of a URL. For example, the identifier may be appended to a URL as a query parameter, or part of a query string that follows a separator. As noted above, the identifier may be any type of identifier or token utilized to associate different transactions and/or provide additional commands to the server system. Examples of identifiers may include a session identifier and a rule identifier, as will be discussed in more detail below. If the request component has an identifier, the process 300 may proceed to operation 306. If the request component does not have an identifier, the process 300 may proceed to operation 308.

At operation 306, the server system may execute the request message. More specifically, the server system may then work to return the requested resource in the request message to the customer user device that sent the request message.

At operation 308, the server system may determine whether the referral component URL has an identifier. As noted above, the referral component URL may identify an address linked to the resource being requested. In certain embodiments, this referral component URL may also have an identifier. If the referral component URL does not have an identifier, the process 300 may proceed to operation 312. If the referral component URL has an identifier, the process 300 may proceed to operation 314.

At operation 312, the server system may generate an identifier. As noted above, operation 312 may be performed when the referral component URL does not have an identifier. Accordingly, the server system may produce and/or generate an identifier for use in the process 300. More specifically, the identifier may be randomly generated and/or generated in a predetermined manner, such as based on past generation of identifiers (e.g., as an incremented value after each identifier generation).

At operation 314, the server system may retrieve the identifier from the referral component URL. As noted above, operation 314 may be performed when the referral component URL has an identifier. Accordingly, the server system may utilize the identifier from the referral component URL for the process 300. Also, as noted above, the identifier may appended to (e.g., at or adjacent to) a rear of a URL as a query parameter, or part of a query string that follows a separator.

At operation 316, the server system may send a redirection instruction to the customer user device. The redirection instruction may be a response message that includes a redirect URL. The redirect URL may include an identifier appended to the request component URL. This identifier may be the identifier noted in operation 312 or operation 314. For example, the identifier may appended to (e.g., at or adjacent to) a rear of a URL as a query parameter, or part of a query string that follows a separator. The server system may send a redirection instruction to the customer user device (e.g., a browser application on the customer user device) as a Temporary Redirect 307. The Temporary Redirect 307 (e.g., HTTP 307 Temporary Redirect) is a redirect status response code that indicates that the resource requested by the request component URL has been temporarily moved to the URL given by the redirect URL. Accordingly, the browser may then send a subsequent request message that includes the redirect URL (e.g., with the session identifier appended to the request component URL).

Figure 4:
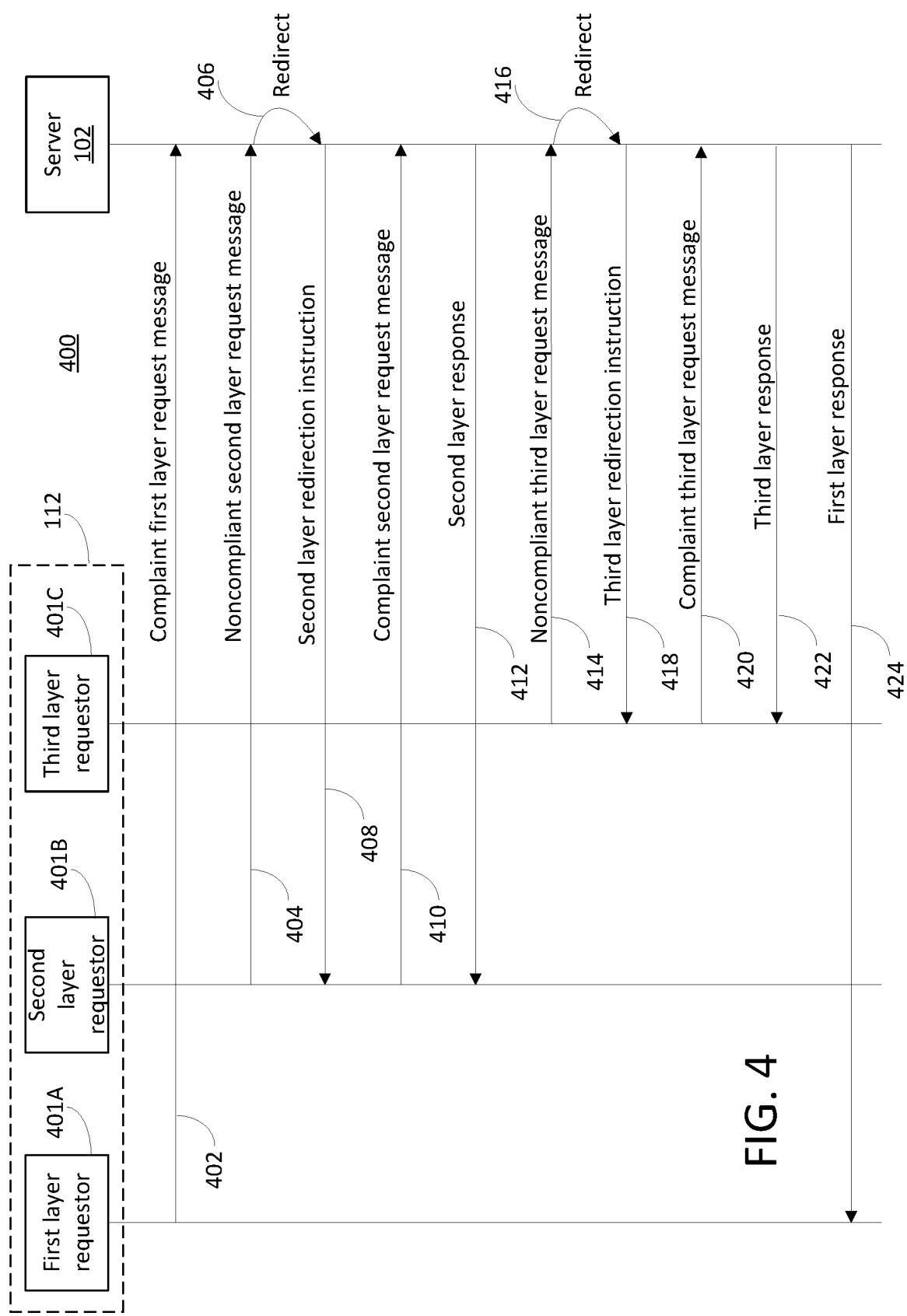
FIG. 4 is a sequence diagram that illustrates an automated identifier propagation sequence, in accordance with various embodiments.

FIG. 4 is a sequence diagram that illustrates an automated identifier propagation sequence 400, in accordance with various embodiments. The sequence 400 may be performed by the server system 102 as well as a first layer requestor 401A, second layer requestor 401B, third layer requestor 401C of an application (e.g., a web browser) on the customer user device 112. The server system 102 may include a datastore, and at least one server implemented as a proxy server and/or a backend server, for example. It is noted that the sequence 400 is merely an example, and is not intended to limit the present disclosure. Accordingly, it is understood that additional operations may be provided before, during, and after the sequence 400 of FIG. 4, certain operations may be omitted, certain operations may be performed concurrently with other operations, and that some other operations may only be briefly described herein. Although a generic example of an identifier is given in FIG. 4, it can be appreciated that any specific type of identifier may be utilized in the embodiments of FIG. 4 as desired for different applications in various embodiments. For example, the identifier recited in FIG. 4 may be a session identifier or a rule identifier.

At operation 402, the first layer requestor 401A may send a compliant first layer request message to the server system 102. As noted above, each of the requestors may be, for example, related to a single application configured to make an original request (e.g., to view a particular website) that may invoke at least one ancillary request (e.g., for resources to present the various parts of a particular website and/or services associated with the original request). Stated another way, the first layer request message may be an original request message from a user that may invoke other applications or libraries. For ease of discussion, reference to a request message being compliant may refer to the request message including an identifier in the request component URL. In contrast, reference to a request message being noncompliant may refer to the request message not including an identifier in the request component URL.

In the illustrated embodiment, the first layer request message may include a request component URL of "https://www.walmart.com?sessionid=1000." In this embodiment, the entire request component URL may be a query string with a separator (e.g., "?") that identifies the query parameter as the string following the separator. Then, the type of identifier, here a session identifier, may be identified (e.g., as "sessionid") and be accorded an identifier value (e.g., "=1000"). However, as will be noted below, other types of identifiers may be utilized such as a rule identifier (e.g., noted as "ruleid") in other embodiments. Also, the referral component URL of the first layer request message may be blank (e.g., without entry).

At operation 404, the second layer requestor 401B may send a noncompliant second layer request message. The second layer may be an ancillary layer to the first layer, such that a second layer request message is invoked by (e.g., linked to) the resource requested in the first layer request message. Also, as noted above, reference to the second layer request message being noncompliant may refer to the second layer request message not including an identifier in the request component URL.

In the illustrated embodiment, the noncompliant second layer request message may include a request component URL of "https://tpc.googlesyndication.com/safeframe/1-0-31/html/container.html." Also, the noncompliant second layer request message may include a referral component URL of "https://www.walmart.com?sessionid=1000." Accordingly, the request component URL may not include an identifier and thus be noncompliant. This may be because there is no identifier located in the query parameter as a string that follows a separator. Stated another way, there is no separator from which an identifier could be entered as a query parameter.

At operation 406, a redirect URL may be produced by the server system 102. The redirect URL may include an identifier appended to the request component URL. The identifier may be taken from the referral component URL. In the illustrated embodiment, the noncompliant second layer request message may include a referral component URL of "https://www.walmart.com?sessionid=1000." Notably, the referral component URL may be a query string with a separator (e.g., "?") that identifies the query parameter as the string following the separator. The query parameter may include an identifier, here a session identifier, that may be identified (e.g., as "sessionid") and be accorded an identifier value (e.g., "=1000"). Accordingly, the session identifier from the referral component URL may be appended to the request component URL as the redirect URL. For example, "https://tpc.googlesyndication.com/safeframe/1-0-31/html/container.html? sessionid=1000" may be the redirect URL in the illustrated embodiment.

At operation 408, a second layer redirection instruction may be sent from the server system 102 to the second layer requestor 401B. The second layer redirection instruction may be a Temporary Redirect 307 (e.g., HTTP 307 Temporary Redirect) redirect status response code that indicates that the resource requested by the second layer request component URL has been temporarily moved to the URL given by the redirect URL. As noted above, in the illustrated embodiment, the redirect URL may be "https://tpc.googlesyndication.com/safeframe/1-0-31/html/container.html? sessionid=1000."

At operation 410, a compliant second layer request message may be sent from the second layer requestor 401B to the server system 102. The compliant second layer request message may be a subsequent request message from the second layer requestor 401B that includes the redirect URL as the request component URL of the compliant second layer request message. Accordingly, In the illustrated embodiment, the compliant second layer request message may include a request component URL of "https://tpc.googlesyndication.com/safeframe/1-0-31/html/container.html?sessionid=1000." Also, the compliant second layer request message may include a referral component URL of "https://www.walmart.com?sessionid=1000." Accordingly, the request component URL may include an identifier and thus be compliant. This may be because there is an identifier located in the query parameter as a strong that follows any separator.

At operation 412, the server system 102 may return (e.g., send) a second layer response. The second layer response may include the requested resource identified in the request component URL of the compliant second layer request message.

At operation 414, the third layer requestor 401C may send a noncompliant third layer request message. The third layer may be an ancillary layer to the first layer and the second layer, such that a third layer request message is invoked by (e.g., linked to) the resource requested in the second layer request message. Also, as noted above, reference to the third layer request message being noncompliant may refer to the third layer request message not including an identifier in the request component URL.

In the illustrated embodiment, the noncompliant third layer request message may include a request component URL of "https://pixel.adsafeprotected.com/rjss/st/201466/29330769/skeleton.js." Also, the noncompliant second layer request message may include a referral component URL of "https://tpc.googlesyndication.com/safeframe/1-0-31/html/container.html? sessionid=1000." Accordingly, the request component URL may not include an identifier and thus be noncompliant. This may be because there is no identifier located in the query parameter as a strong that follows any separator. Stated another way, there is no separator from which an identifier could be entered as a query parameter.

At operation 416, a redirect URL may be produced by the server system 102. The redirect URL may include an identifier appended to the request component URL. The identifier may be taken from the referral component URL. In the illustrated embodiment, the noncompliant third layer request message may include a referral component URL of "https://tpc.googlesyndication.com/safeframe/1-0-31/html/container.html? sessionid=1000." Notably, the referral component URL be a query string with a separator (e.g., "?") that identifies the query parameter as the string following the separator. The query parameter may include identifier, here a session identifier, that may be identified (e.g., as "sessionid") and be accorded an identifier value (e.g., "=1000"). Accordingly, the session identifier from the referral component URL may be appended to the request component URL as the redirect URL. For example, "https://pixel.adsafeprotected.com/rjss/st/201466/29330769/skeleton.js? sessionid=1000" may be the redirect URL in the illustrated embodiment.

At operation 418, a third layer redirection instruction may be sent from the server system 102 to the third layer requestor 401C. The third layer redirection instruction may be a Temporary Redirect 307 (e.g., HTTP 307 Temporary Redirect) redirect status response code that indicates that the resource requested by the third layer request component URL has been temporarily moved to the URL given by the redirect URL (e.g., the location headers of the Temporary Redirect 307, or as a query parameter associated with the request component URL). As noted above, in the illustrated embodiment, the redirect URL may be "https://pixel.adsafeprotected.com/rjss/st/201466/29330769/skeleton.js? sessionid=1000."

At operation 420, a compliant third layer request message may be sent from the third layer requestor 401C to the server system 102. The compliant third layer request message may be a subsequent request message from the third layer requestor 401C that includes the redirect URL as the request component URL. In the illustrated embodiment, the compliant third layer request message may include a request component URL of "https://pixel.adsafeprotected.com/rjss/st/201466/29330769/skeleton.js? sessionid=1000." Also, the compliant second layer request message may include a referral component URL of "https://tpc.googlesyndication.com/safeframe/1-0-31/html/container.html? sessionid=1000." Accordingly, the third layer request component URL may include an identifier and thus be compliant. This may be because there is an identifier located in the query parameter as a strong that follows any separator.

At operation 422, the server system 102 may return (e.g., send) a third layer response message. The third layer response message may include the requested resource identified in the request component URL of the compliant third layer request message.

At operation 424, the server system 102 may return (e.g., send) a first layer response message. The first layer response message may include the requested resource identified in the request component URL of the compliant first layer request message.

Figure 5:
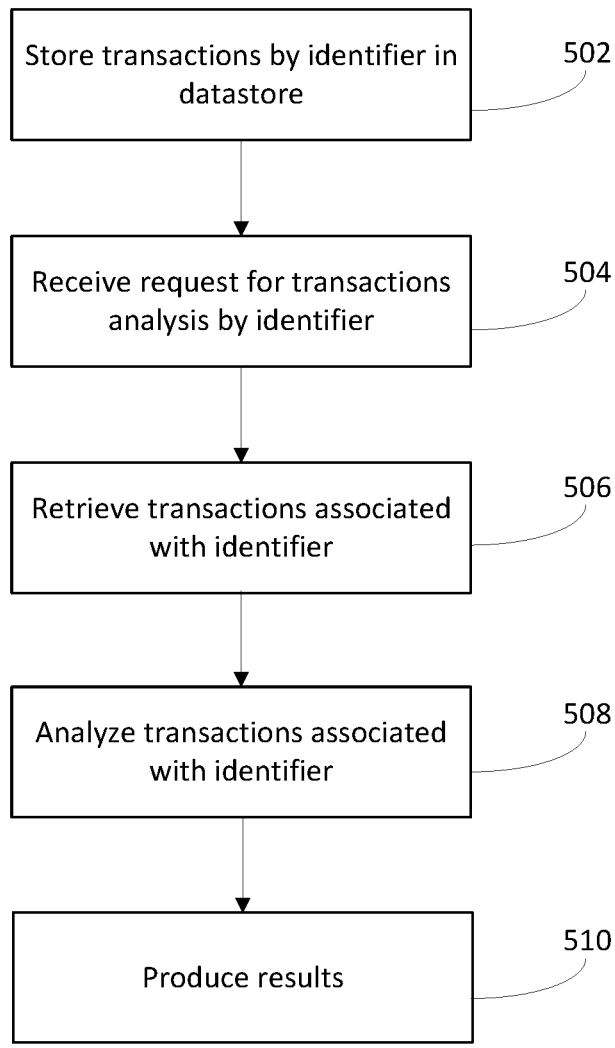
FIG. 5 is a block diagram that illustrates a transactions analysis process, in accordance with various embodiments.

FIG. 5 is a block diagram that illustrates a transactions analysis process 500, in accordance with various embodiments. The process 500 may be performed at an automated identifier propagation server system in communication with a customer user device, as introduced above. The automated identifier propagation server system may include a datastore (e.g., a transactions datastore) and at least one server implemented as a proxy server and/or a backend server, for example. It is noted that the process 500 is merely an example, and is not intended to limit the present disclosure. Accordingly, it is understood that additional operations may be provided before, during, and after the process 500 of FIG. 5, certain operations may be omitted, certain operations may be performed concurrently with other operations, and that some other operations may only be briefly described herein.

At operation 502, the server system may store transaction data by identifier in a transactions datastore. This transactions data may be any characterization of interactions between a client and server as associated with an identifier. As noted above, such identifiers may be appended to request component URLs and thus the transactions data may be any characterizable aspect associable with a request component URL, such as a time, application, requested resource, and the like. For example, this transactions data may characterize aspects of a connection, request, response, and/or a close between a client and a server as associated with an identifier.

In various embodiments, these identifiers may be, for example, session identifiers. These session identifiers may be utilized to identify a session, or a set of related transactions tracked by a common session identifier. For example, the session identifier may be represented with a value (e.g., an integer value) and be identifiable within a URL. For example, when the session identifier has a value of 1000, the session identifier may be identified as part of the URL when represented as "sessionid=1000." Accordingly, the server may send the resource requested by the request component URL to the browser (e.g., the user device) while also associating transactions data (e.g., any characterizable aspect of the transaction) with the session identifier appended to the request component URL.

At operation 504, a request for transactions analysis may be retrieved by the server system from a customer user device. This request for transactions analysis (e.g., transactions analysis request) may indicate an analysis type and the session identifier. For example, the transactions analysis request may indicate the type of analysis to be performed by the server system. The analysis type may indicate how the transactions data is to be processed by the server system prior to being sent to the customer user device. Also, the session identifier may be utilized to look up (e.g., identify) the requested transactions data (e.g., transactions data associated with a particular session identifier).

At operation 506, transactions data associated with the session identifier in the transactions analysis request may be retrieved from the datastore. For example, the datastore may be a transactions datastore. Thus, the server system may be configured to query and retrieve transactions data in the transactions datastore that are associated with a particular session identifier.

At operation 508, the retrieved transactions data may be processed according to the analysis type identified in the transactions analysis request to produce a result. For example, the transactions analysis request may indicate that the transactions data should be processed in accordance with a particular statistical model to produce a result as processed transactions data. In other embodiments, the transactions analysis request may indicate that the transactions data should not be processed by the server system (e.g., not be processed via a particular statistical model) but be rather sent back to the requesting customer user device for display and/or further processing. Thus, the transactions analysis request may indicate that the result should simply be the requested transactions data associated with the provided session identifier.

At operation 510, the result may be sent back to the customer user device. As noted above, the result may be either the transactions data processed by the server system in a particular manner or unprocessed, as indicated by the analysis type of the transactions analysis request.

In certain embodiments, the session identifier may be associated with a particular user, a particular user device, a particular time, and/or any other usage characteristic useful for analysis. Advantageously, multiple requests (e.g., for analysis) may be executed in parallel by the server system yet be differentiable by each request having a respective different session identifier. This may enable parallel tests and network analytics for these parallel tests. For example, each parallel test and/or set of parallel requests may be differentiated by specific users, demographic areas, or any other differentiator as indicated by respective session identifier values. Also, such requests with session identifiers may identify and provide unique user data with third party applications without sending personal information from the user device (e.g., by anonymizing requests by session identifier rather than personal information).

Figure 6:
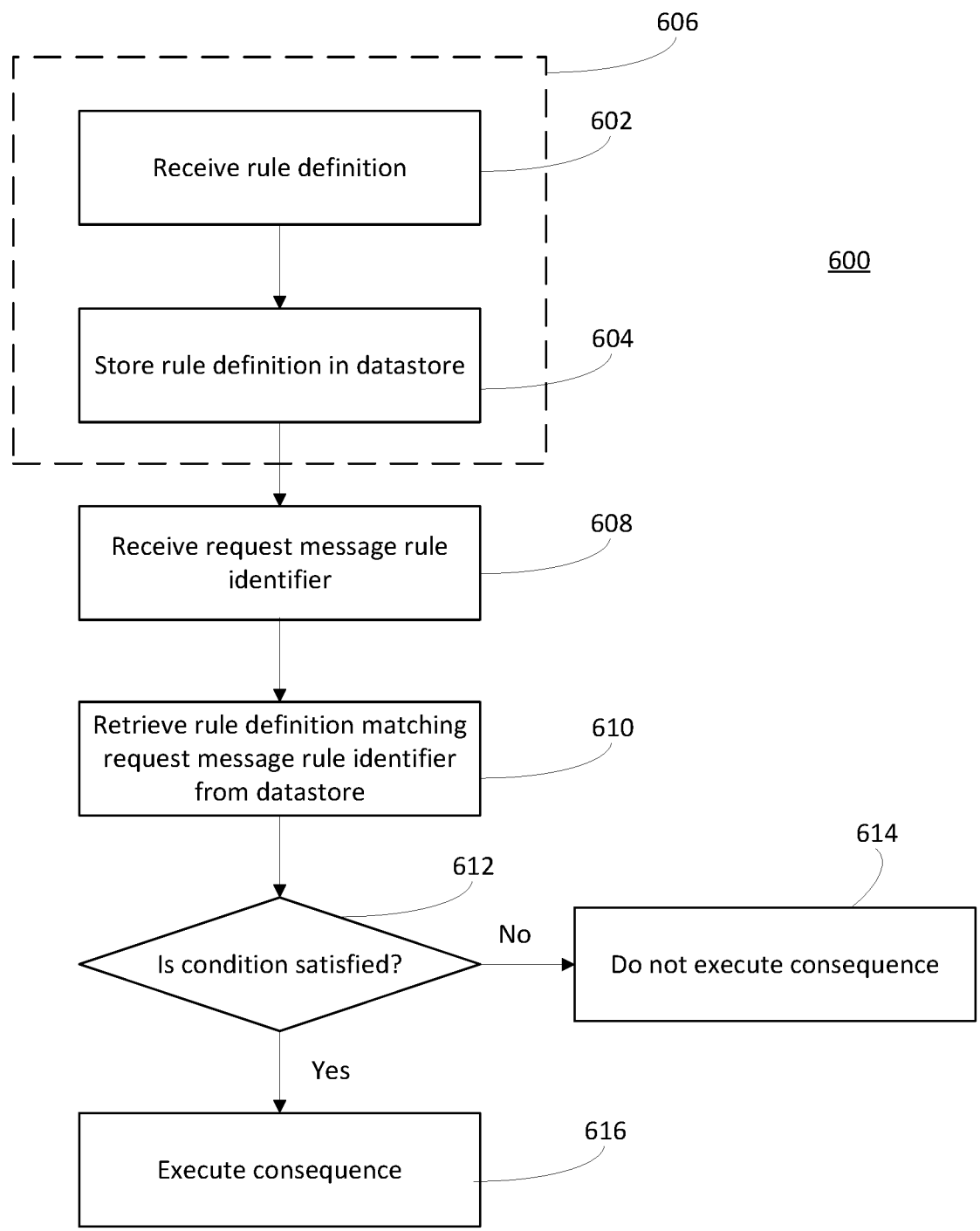
FIG. 6 is a block diagram that illustrates a rule identifier process, in accordance with various embodiments.

FIG. 6 is a block diagram that illustrates a rule identifier process 600, in accordance with various embodiments. The process 600 may be performed at an automated identifier propagation server system in communication with a customer user device and/or a operator user device, as introduced above. The automated identifier propagation server system may include a datastore (e.g., a rules datastore) and at least one server implemented as a proxy server and/or a backend server, for example. It is noted that the process 600 is merely an example, and is not intended to limit the present disclosure. Accordingly, it is understood that additional operations may be provided before, during, and after the process 600 of FIG. 6, certain operations may be omitted, certain operations may be performed concurrently with other operations, and that some other operations may only be briefly described herein.

At operation 602, the server system may receive at least one rule definition from an operator user device. The at least one rule definition may also be referred to as a rule definition set of one or more rule definitions. Each rule definition may be associated with an identifier that is a rule identifier. Each rule definition may include a rule condition and a rule consequence. A rule condition may be a conditional situation, determinable by the server system, that may invoke the rule consequence. The rule consequence may be an action, taken by the server system, in response to satisfaction of the rule condition.

At operation 604, the server system may store the rule definition set in a rules datastore. More specifically, the rule definition set may be stored by rule identifier within the rules datastore. Thus, each of the rule definitions stored in the rules datastore may be retrieved, or otherwise located, by their associated rule identifier.

In certain embodiments, the combination of operations 602 and 604 may be referred to as operator user device processes 606, as they may be performed by an automated identifier propagation server system in communication with a operator user device. As noted above, an operator user device may specifically refer to a user device that may provide rule definitions to the automated identifier propagation server system. However, in other embodiments, there may be no distinction between operator user devices and customer user devices as user devices may both provide rule definitions to the automated identifier propagation server system as well as furnish request messages to, and receive response messages from, the automated identifier propagation server system.

At operation 608, the server system may receive a request message that includes a rule identifier (e.g., a request message rule identifier). This request message may be, for example, a compliant request message that includes an identifier that is a rule identifier. More specifically, this compliant request message may include includes a request component URL that includes the rules identifier. For example, the request component URL may be "https://www.walmart.com?ruleid=1000." In this embodiment, the entire request component URL may be a query string with a separator (e.g., "?") that identifies a query parameter with the rule identifier in the string following the separator. Thus, the rule identifier may be identified (e.g., as "ruleid") and be accorded an identifier value (e.g., "=1000").

At operation 610, a rule definition may be retrieved from the rules datastore in accordance with the rules identifier of the compliant request message. As noted above, the server system may be configured to retrieve rule definitions based on rule identifiers (e.g., as identified by an associated rule identifier).

At operation 612, a decision may be made as to whether the rule condition of the rule definition is satisfied. A rule condition may define a conditional situation for application of a rule consequence. For example, a rule condition may be receipt of a particular rule identifier in even intervals (e.g., every second receipt of the particular rule identifier) and the rule consequence may be redirection from the request component URL to another predetermined URL. Then, upon satisfaction of the rule condition (e.g., at every second receipt of the particular rule identifier) the rule consequence may be executed (e.g., redirection from the request component URL to another predetermined URL). As noted above, in particular embodiments the rule identifier may be represented with a value (e.g., an integer value) and be identifiable within a URL.

In certain embodiments, a rule condition may be more than just receipt of a rule identifier. For example, the rule condition may be based on a history of transactions with one or more user devices. As a more specific example, the rule condition may be based on historical requests from a particular user device and/or from a history of transactions with a user device. As another example, the rule condition may be based on a state of a network element ascertainable by the server. For example, the rule condition may be based on whether the server system is able to access a particular service (e.g., whether a specific application is responsive in a desired manner to the server system). If the rule condition is not satisfied, then the process 600 may proceed to block 614. However, if the rule condition is satisfied, then the process 600 may proceed to block 616.

At block 614, the rule consequence identified in the rule definition may not be executed. This may be due to, as noted above, the rule condition not being satisfied.

At block 616, the rule consequence identified in the rule definition may be executed. In particular embodiments, a rule consequence may be a modification of a network element, as controlled or instructed by the server. For example, the rule consequence may be a modification or change of a resource requested by a request message. As a further example, the rule consequence may include a modification of, for example, a URL, a header, a cookie, a query parameter, or any other network element. In particular embodiments, the rule consequence may be modification of a requested resource, such as modification of a characterization of inventory (e.g., items for sale) as accessible to a customer.

Advantageously, different rule identifiers may be applied to multiple request messages for parallel, rather than series, execution by a server. For example, a server may receive multiple request messages that each have different rule identifiers. The server may determine whether each associated rule condition is satisfied and execute each respective rule consequence in parallel for each request message based on the different rule identifiers. In particular embodiments, these rule identifiers may be utilized to inject faults (e.g., to simulate faulty scenarios) for testing purposes (e.g., for parallel test execution). For example, an original request (e.g., to view a particular website) may invoke multiple ancillary requests (e.g., for various resources to present the various parts of a particular website). Thus, the rule identifier may be propagated from the original request to the ancillary requests so that the body of requests (e.g., the original and ancillary requests) may all be processed by the server in accordance with the rule identifier associated with the original request.

Accordingly, automated identifier propagation may be utilized to implement an automated test solution that allows for mutation of representational state transfer application programming interfaces, either inbound or outbound, based on predefined rules (e.g., rule definitions invoked by rule identifiers in request messages). This may allow for querying of network traffic for application analytics testing in parallel (e.g., in virtue of the rule identifiers propagated among related request messages).

In certain embodiments, a proxy server may be utilized to separate network traffic based on different rule identifiers or session identifiers. This would support parallel test executions to implement a functionality to intercept inbound or outbound calls to mutate the calls with predefined rules added to the system. Furthermore, network data may be queried for analytics testing for individual test cases (e.g., sessions) for validation. In certain embodiments, automated identifier propagation may be applied to e-commerce platforms for automated analytics testing.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two, which can be designed using source coding or some other technique), various forms of program or design code incorporating instructions (which can be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware, firmware or software, or a combination of these technique, depends upon the particular application and design constraints imposed on the overall system. Skilled artisans can implement the described functionality in various ways for each particular application, but such implementation decisions should not be interpreted as causing a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A system, comprising:
   at least one processor operatively coupled with a datastore, the at least one processor configured to:
   receive, from a user device, a request message comprising a request component uniform resource locator and a referral component;
   determine that the request component uniform resource locator does not comprise a session identifier;
   check the referral component for a session identifier;
   produce a redirect uniform resource locator comprising a session identifier found in the referral component appended to a request component of the redirect uniform resource locator; and
   send, to the user device, a redirection instruction comprising the redirect uniform resource locator, wherein the redirection instruction indicates that a resource requested by the request message has been temporarily moved to the redirect uniform resource locator.

2. The system of claim 1, wherein the at least one processor is further configured to:
   receive, from the user device, a second request message comprising the redirect uniform resource locator as a result of the redirection instruction being sent to the user device.

3. The system of claim 1, wherein the session identifier comprises a numerical value.

4. The system of claim 1, wherein the session identifier found in the referral component comprises a current session identifier.

5. The system of claim 1, wherein the session identifier found in the referral component is a current session identifier.

6. The system of claim 1, wherein the at least one processor is further configured to:
   determine that the referral component does not comprise a session identifier;
   generate a current session identifier in response to the referral component not comprising a session identifier; and
   produce a redirect uniform resource locator comprising the generated session identifier appended to the request component uniform resource locator.

7. The system of claim 1, wherein the at least one processor is further configured to:
   send, to the user device, the resource requested by the request message in response to the redirect uniform resource locator comprising the session identifier found in the referral component.

8. A method performed by a computing device, comprising:
   receiving, from a user device, a request message comprising a request component uniform resource locator and a referral component;
   determining that the request component uniform resource locator does not comprise a session identifier;
   checking the referral component for a session identifier;
   producing a redirect uniform resource locator comprising a current session identifier found in the referral component appended to a request component of the redirect uniform resource locator; and
   sending, to the user device, a redirection instruction comprising the redirect uniform resource locator, wherein the redirection instruction indicates that a resource requested by the request message has been temporarily moved to the redirect uniform resource locator.

9. The method of claim 8, further comprising:
   storing information that characterizes transactions associated with the current session identifier in a datastore.

10. The method of claim 9, further comprising:
    receiving, from the user device, a request for transactions analysis associated with the current session identifier.

11. The method of claim 10, further comprising:
    sending, to the user device, results of an analysis of the information in response to receiving the request for transactions analysis associated with the current session identifier.

12. The method of claim 10, further comprising:
    sending, to the user device, the information in response to receiving the request for transactions analysis associated with the current session identifier.

13. The method of claim 8, wherein the current session identifier is stored in a datastore.

14. A non-transitory computer readable medium having instructions stored thereon, wherein the instructions, when executed by a processor, cause a device to perform operations comprising:
    receiving, from a user device, a request message comprising a request component uniform resource locator and a referral component;
    determining that the request component uniform resource locator does not comprise a session identifier;
    checking the referral component for a session identifier;
    producing a redirect uniform resource locator comprising a current session identifier found in the referral component appended to a request component of the redirect uniform resource locator; and
    sending, to the user device, a redirection instruction comprising the redirect uniform resource locator, wherein the redirection instruction indicates that a resource requested by the request message has been temporarily moved to the redirect uniform resource locator.

15. The non-transitory computer readable medium of claim 14, wherein the resource is utilized to present a webpage on the user device via a browser.

16. The non-transitory computer readable medium of claim 14, wherein the current session identifier is associated with a user.

17. The non-transitory computer readable medium of claim 14, wherein the session identifier comprises an integer value.

18. The non-transitory computer readable medium of claim 14, wherein the redirection instruction is a temporary redirect 307.

19. The non-transitory computer readable medium of claim 14, wherein the processor is part of one of: a proxy server and a backend server.

* * * * *